United States Patent [19]

Gonsalves et al.

[11] Patent Number: 6,033,711
[45] Date of Patent: Mar. 7, 2000

[54] FAT-FREE/LOW-FAT, FROZEN WHIPPED TOPPING

[75] Inventors: Alexander A. Gonsalves, Libertyville; Donald C. Hannan, Grayslake; Rafael J. Marquez, Chicago; Krzysztof Mosiewicz, Morton Grove; Rajendra Borwankar, Addison, all of Ill.; Kenneth M. Tabasco, New Windsor, N.Y.

[73] Assignee: Kraft Foods, Inc., Northfield, Ill.

[21] Appl. No.: 09/005,865

[22] Filed: Jan. 12, 1998

Related U.S. Application Data

[62] Division of application No. 08/591,052, Jan. 25, 1996, Pat. No. 5,707,677.

[51] Int. Cl.⁷ ............................................. A23C 1/19
[52] U.S. Cl. ............................................. 426/565; 426/564
[58] Field of Search .................. 426/565, 564, 426/567, 570

[56] References Cited

U.S. PATENT DOCUMENTS

| | | | |
|---|---|---|---|
| 2,970,918 | 2/1961 | Peterson | 426/565 |
| 3,246,992 | 4/1966 | Noznick | 426/567 |
| 3,656,972 | 4/1972 | Blomberg | 426/570 |
| 3,746,552 | 7/1973 | Zielenski | 426/565 |
| 3,809,764 | 5/1974 | Gabby | 426/163 |
| 3,889,001 | 6/1975 | Buide | 426/565 |
| 4,012,533 | 3/1977 | Jones | 426/565 |
| 4,034,122 | 7/1977 | Patterson | 426/570 |
| 4,251,560 | 2/1981 | Dell | 426/565 |
| 4,411,926 | 10/1983 | Trumbetas | 426/565 |
| 4,451,492 | 5/1984 | Dell et al. | 426/564 |
| 4,478,867 | 10/1984 | Zobel | 426/565 |
| 4,505,943 | 3/1985 | Dell | 426/570 |
| 4,985,270 | 1/1991 | Singer | 465/565 |
| 5,077,076 | 12/1991 | Gonsalves | 426/570 |
| 5,384,145 | 1/1995 | Gonsalves | 426/565 |
| 5,384,146 | 1/1995 | Gonsalves | 426/565 |
| 5,707,677 | 1/1998 | Gonsalves | 426/564 |
| 5,759,609 | 6/1998 | Lynch | 426/570 |

*Primary Examiner*—Carolyn Paden
*Attorney, Agent, or Firm*—Thomas R. Savoie; Thomas A. Marcoux

[57] ABSTRACT

A fat-free/low-fat frozen whipped topping is formulated with from 0.5–3% food starch. Preferably the starch is in modified, cross-linked, low-amylose starch such as waxy maize. The topping is prepared by combining a homoginized emulsion preblend with an aqueous, gelatinized starch preblend and the aerating, whipping and freezing the mixture.

10 Claims, No Drawings

FAT-FREE/LOW-FAT, FROZEN WHIPPED TOPPING

This application is a divisional of application Ser. No. 08/591052 filed on Jan. 25, 1996 now U.S. Pat. No. 5,707,677.

BACKGROUND OF THE INVENTION

1. Field of the Invention

This invention relates to a formulation and process for producing a fat-free/low-fat, preferably non-dairy, frozen whipped topping which will be freeze-thaw stable and which will retain a stable foam structure and texture for at least twenty-one days of refrigerator (40° F.) storage.

2. Description of the Prior Art

Compositions and processes for preparing either dairy or non-dairy frozen whipped toppings are known in the art U.S. Pat. Nos. 3,431,717 to Lorant, 4,411,926 to Trumbetas et al., 4,251,560, 4,451,452 and 4,505,943 to Dell et al., and 4,478,867 to Zobel et al. relate to such compositions and processes. The disclosures of these patents enable the production of freeze-thaw stable, frozen whipped toppings which are distributed as frozen products, which are thawed prior to use, and which can be stored in the refrigerator for 21 days without textural breakdown. The aforementioned prior art patents related to frozen whipped toppings wherein the fat content is about 20% or more. U.S Pat. No. 5,077,076 to Gonsalves et al. has disclosed formulations and processes which have enabled the production of comparably stable, frozen whipped toppings having a fat content of about 13% and a not-fat milk solids contents of 2.5 to 7%. U.S. Pat. No. 5,384,145 to Gonsalves et al. has disclosed stable, low-fat frozen whipped topping formulations which have a fat content of 8 to 15% and which are free of milk solids.

SUMMARY OF THE INVENTION

The invention enables the production of stable, fat-free/low-fat frozen whipped toppings having a fat content of less than 10%, preferably less than 7% and most preferably from 3 to 6.5%. According to this invention it is possible to produce a frozen whipped topping wherein the level of fat per two tablespoon (30 ml.) serving (approximately 9 grams) is less than 0.5 grams. Food products that contain less than 0.5g/serving are, according to present United States regulatory food standards, permitted to be labeled as "fat-free". Based on a 9 gram serving size, fat-free products, as defined in this invention will have a fat content of less than 5.54%.

Fat-free frozen whipped toppings are possible in accordance with this invention by including in the formulation from 45 to 65% water and 0.5 to 3% of a food starch in combination with 0 to 10% fat, 25 to 45% water-soluble carbohydrates (and/or their alcohol derivatives), 0.1 to 1% polysaccharide gums, 0.2 to 1% water-soluble protein and 0.1 to 1% emulsifier. The fat-free frozen whipped toppings may be prepared by: (1) forming an emulsion preblend containing water, fat, emulsifier, water-soluble carbohydrate, polysaccharide gum, water-soluble protein and preferably flavor and color; (2) forming a starch preblend containing water, food starch and preferably water-soluble carbohydrate; (3) combining the two preblends and thereafter; (4) whipping and freezing.

All ratios and percents (except overrun) used in the description of this invention are by weight. As used in the specification and claims the term "water-soluble carbohydrates" is intended to include alcohol derivatives, such as mannitol and sorbitol. Other than in the operating examples, or where otherwise indicated, all numbers expressing quantities of ingredients, parameters, or operating conditions used herein are to be understood as modified in all instances by the term "about".

DESCRIPTION OF PREFERRED EMBODIMENTS

The fat-free/low-fat frozen whipped topping of this invention will have a total solids content of at least 35%, preferably 40 to 50%, a fat level of less than 7%, most preferably 3 to 6.5%, a food starch level of 0.5 to 3%, preferably 1 to 2% and an overrun in excess of 250%, preferably about 295%.

The fats used in the formulation of this invention are preferably the vegetable fats or oils commonly employed in frozen whipped toppings. Such fats or oils may be fully or partially hydrogenated. Hydrogenated oils, such as coconut and palm kernel oil, have typically been used in the production of frozen whipped toppings. Animal fats, such as milk fat, would be functional in the formulation of this invention. Milk fat would, of course, not be used in the production of non-dairy formulations. Partially hydrogenated vegetable oils such as cottonseed, peanut, olive, corn, soy or the like could be useful for use in this invention.

The food starch will preferably be a modified starch, such as a freeze-thaw stable starch. The starch component is believe to provide the viscosity required for air cell stability and syneresis control within the thawed whipped topping. Starch is also seen as partially replacing some of the structure forming and mouthfeel functions lost due to the reduced fat level present in the formulations of this invention. A preferred starch is a modified (e.g., hydroxypropylated), cross-linked starch. A low-amylose starch, such as waxy maize starch, has been successfully employed in the formulations of this invention.

A preferred emulsifier level is 0.1 to 0.5%. Among the emulsifying agents which may be useful in this invention are: the monoglycerides of fatty acids, such as monostearin; polyoxyalkylene ethers of fatty esters of polyhydric alcohols, such as the polyoxyethylene ethers of sorbitan monostearate (e.g., polysorbate 60); or sorbitan tristearate (e.g., polysorbate 65); fatty esters of polyhydric alcohols, such as sorbitan monostearate; esters of glycerol and fatty acids, such as propylene glycerol monostearate; partial esters of carboxylic acids and glycosides of fatty acids, such as glycerol lactopalmitate; and polyglycerol esters of fatty acids. Preferably a combination of sorbitan ester emulsifying agents is employed; and polysorbate 65 appears to be a preferred emulsifier component, as a smoother finished product seems to be produced during whipping. A preferred use level for polysorbate 65 is 0.03 to 0.19%. Emulsifier combinations which include both polysorbate 60 and polysorbate 65 are highly preferred for use in this invention.

A preferred level for the water-soluble protein component is 0.3 to 0.8%. Sodium caseinate is the preferred protein material; however, other protein materials known to have emulsifying and aerating properties, such as casein hydrolyzsates, milk protein concentrates, vegetable protein concentrates and hydrolyzed vegetable protein should also be useful.

The weight ratio of chemical emulsifiers to fat and water-soluble protein to fat are important for the formulations of the invention, particularly no-dairy formulations. The ratios need to be sufficiently high to obtain a foamed emulsion which has good stability and sufficiently low to enable easy and consistent whipping. At these ratios, the interface between fat and water is believed to contain the proper balance of protein and emulsifier to produce these effects. Ratios of 2.3–5.0, preferably 3.0–4.0, parts emulsifiers to 100 parts fat and 4–12 parts protein to 100 parts fat are preferred.

Polysaccharide gums, are also required in the formulations of this invention at a level of from 0.1 to 1%, preferably 0.1 to 0.5%. These gum stabilizers are also believed to assist in providing structure to the foam, improving the mouth-feel of the product and preventing syneresis. Vegetable or synthetic gums such as carrageenan, xanthan, guar, locust bean, alginate and the like, or carboxymethylcellulose, methylcellulose ether and the like, and mixtures thereof should be useful in this invention. A combination of xanthan gum and galactomannan gum, such as locust bean gum and/or guar gum has proven to be useful in this invention.

The preferred level of water-soluble carbohydrates is 35 to 45%. Hydrolyzed starch solids, which contain significant amounts of tri-and higher saccharides will also be present in order to provide a desirable smoothness level. As noted in Gonsalves et al., U.S. Pat. No. 5,384,145, at least 25%, preferably at least 30% of the total saccharides should be tri- or higher saccharides.

It has been found that the use of a relatively high level of acid-derived corn syrup solids, either as a dry ingredient or as present in corn syrup in the formulations of the invention will result in a reduced formula pH, normally falling in a range of 5.8 to 6.0. As the functionality of the water-soluble protein, sodium caseinate, is better in the pH range of 6.0 to 7.0, it is desirable to raise the pH of the formulation by the addition of a basic material. The addition of from 0.001 to 0.02% of an alkaline material, such as sodium hydroxide, has proven to be effective.

Various flavors, colors or nutritional ingredients may be added in minor amounts in order to produce a commercially-acceptable product.

The fat-free/low-fat frozen whipped topping of this invention may be prepared generally in accordance with the process set forth in the U.S. Pat. Nos. 4,478,867 to Zobel et al. and 5,384,145 to Gonsalves et al., both of which are hereby incorporated by reference. However, in contrast to the processes of these two patents where all ingredients are batched together, the starch-containing formulation of this invention is preferably prepared by forming an aqueous emulsion preblend which is homogenized and then combined with an aqueous starch preblend. In this manner the starch component avoids the high shear environment encountered in the high pressure homogenization step.

Thus, an aqueous mixture containing the fat and emulsifiers is prepared for homogenization at a pressure of at least 6,000 psig. Typically, the mixture will be heat processed (e.g. pasteurized) prior to homogenization and cooled to about 4.4° C. (40° F.) after homogenization. The resulting emulsion preblend is then aged for a period of time sufficient to permit fat crystallization, aerated and whipped in accordance with aforementioned patents. The emulsion preblend will contain the majority of, and typically all, of the polysaccharide gums and water-soluble proteins. The emulsion preblend will also contain a major portion of the water-soluble carbohydrates. It has been found desirable to include a minor portion of the water-soluble carbohydrates in the starch preblend.

The aqueous starch preblend will contain all of the starch and usually a portion of the water-soluble carbohydrates. The starch preblend is heated above 71.1° C. (160° F.) to gelatinize the starch and then cooled to about 4.4° C. After gelatinization, the aqueous starch pre-blend is combined with the homogenized emulsion preblend. This is usually done prior to the aging step, but may be done at any time prior to the whipping step. The homogenized emulsion and aqueous starch preblend may be cooled separately to about 4.4° C. prior to being combined and passed to aging. Alternatively the homogenized, uncooled emulsion could be combined with the aqueous uncooled starch preblend and then passed to the cooler.

After the product has been aerated and whipped to the desired extent, the pressure is then reduced to atmospheric pressure in a gradual and continuous manner. This pressure reduction may be effected by means of a length of pipe having the appropriate diameter and length. It has been found desirable to maintain all or at least a portion of the discharge pipe in a sub-ambient temperature environment, such as by being submerged chilled water or by insulating the piping to retain chilled product temperature.

Upon reaching atmospheric pressure, the temperature of the whipped emulsion should be from about 10.0° C. (50° F.) to about 15.6° C. (60° F.). Aeration and whipping are performed under elevated backs pressures, ranging between 40 to 95 psig; however, in commercial production, pressures of from 80 to 95 psig are most desirable. In typical plant operation the whipped emulsion is passed to a filler, packaged in containers for retail sales and frozen at −17.8° C. (0° F.) or below.

The following example further illustrates various features of this invention but is not intended to in any way limit the scope of the invention, which is defined in the appended claims.

EXAMPLE

An emulsion preblend was formulated as follows:

| Ingredient | Parts |
| --- | --- |
| Water | 40.30 |
| Hydrogenated Vegetable Oil | 7.90 |
| Corn Syrup (42 DE, 80% solids) | 50.00 |
| Sodium Caseinate | 0.73 |
| Polysorbate 60 and Sorbitan Monostearate | 0.20 |
| Xanthan and Guar Gums | 0.34 |
| Polysorbate 65 | 0.05 |
| Flavor and Color | 0.46 |
| NaOH (50% solution w/w) | 0.14 |

A starch preblend was formulated as follows:

| Ingredient | Parts |
| --- | --- |
| Water | 57.2 |
| Modified cross-linked waxy maize starch | 3.6 |
| Corn syrup | 39.1 |

Two parts of the emulsion preblend was combined with one part of the starch preblend in the manner described below to obtain the following formulation:

| Ingredient | Parts |
| --- | --- |
| Water | 45.91 |
| Hydrogenated vegetable Oil | 5.28 |
| Corn Syrup | 46.40 |
| Sodium Caseinate | 0.49 |
| Starch | 1.20 |
| Xanthan and Guar Gums | 0.23 |
| Polysorbate 60 and Sobitan Monostearate | 0.14 |
| Polysorbate 65 | 0.04 |
| Flavor and Color | 0.30 |
| NaOH (50% solution w/w/) | 0.01 |
| Total Solids: 44.5% | |
| pH: 6.4 | |

The emulsion preblend was batched, held at 160–165° F. for 15 minutes and passed to a two-stage homogenizer (8,000 psig first stage and 500–600 psig second stage). The starch preblend was batched, held at 190–195° F. for 10 minutes, cooled to 40° F. and combined with the homogenized emulsion preblend. The total formulation was cooled to 40° F. and held in a stirred aging tank at 40–44° F. for 60 minutes. The aged emulsion was then fed to a continuous recycle mixer where sufficient air was introduced in order to produce an overrun of about 295% in the final product. The pressure into the mixer was about 94 psig, the pressure out of the mixer was about 90 psig. The emulsion was then fed through a one-inch pipe at a flow rate of about 85 pounds per minute. The exit pressure from the pipe was about 80 psig. The emulsion was then passed through a series of four, cooled, scraped-surface heat exchangers where it is whipped and from which it exits at a temperature of about 58° F. The pressure on the whipped emulsion is reduced to atmospheric by passage through a 40 foot length of 1.25 inch piping which is insulated to maintain product temperature. The product was put in containers and frozen to a temperature of 0° F. The product, which had a fat level of less than 0.5 grams per 30 ml. serving was judged to be freeze-thaw stable and the thawed product was judged to have high-quality flavor, texture and overrun, comparable to Non-Dairy Cool Whip° Frozen Whipped Topping, after 21 days of refrigerator storage.

Having thus described the invention what is claimed is:

1. A non-dairy, fat-free/low-fat frozen whipped topping comprising on a weight basis:

45–65% water,

0–7% fats or oils,

25–45% water-soluble carbohydrates, 0.5–3% food starch, 0.1–1% polysaccharide gums, 0.2–1% water-soluble protein, 0.1–1% emulsifiers, said topping having a non-dairy formulation and said topping being freeze-thaw stable and being able to retain a stable foam structure and texture for at least twenty-one days of refrigerator storage.

2. The frozen whipped topping of claim 1 comprising on a weight basis:

40–50% total solids

3–6.5% fat

35–45% water-soluble carbohydrates

1–2% food starch 0.1–0.5% polysaccharide gums 0.3–0.8% water-soluble protein 0.1–0.5% emulsifiers.

3. The frozen whipped topping of claim 1 wherein the food starch is a modified, cross-linked starch.

4. The frozen whipped topping of claim 3 wherein the starch is a hydroxypropylated waxy maize starch.

5. The frozen whipped topping of claim 1 which further includes a basic material to adjust the pH of the topping to 6.0 to 7.0.

6. The frozen whipped topping of claim 5 which contains from 0.001% to 0.2% sodium hydroxide.

7. The frozen whipped topping of claim 1 wherein the level of water-soluble carbohydrates is from 30 to 42%.

8. The frozen whipped topping of claim 1 wherein the ratio of chemical emulsifiers to 100 parts of fat is from 2.3 to 5.0.

9. The frozen whipped topping of claim 1 wherein from 0.03 to 0.19% polysorbate 65 is present.

10. The frozen whipped topping of claim 1 wherein the ratio of chemical emulsifiers to 100 parts of fat is from 3.0 to 4.0.

* * * * *